(12) United States Patent
Åström

(10) Patent No.: US 8,890,365 B2
(45) Date of Patent: Nov. 18, 2014

(54) FUEL CELL DEVICE AND METHOD FOR FEEDING ELECTRICAL CURRENT TO ELECTRICAL NETWORK

(75) Inventor: Kim Åström, Kirkkonummi (FI)

(73) Assignee: Convion Oy, Espoo (FI)

(*) Notice: Subject to any disclaimer, the term of this patent is extended or adjusted under 35 U.S.C. 154(b) by 667 days.

(21) Appl. No.: 13/154,936

(22) Filed: Jun. 7, 2011

(65) Prior Publication Data

US 2011/0234009 A1 Sep. 29, 2011

Related U.S. Application Data

(63) Continuation of application No. PCT/FI2009/050968, filed on Dec. 1, 2009.

(30) Foreign Application Priority Data

Dec. 9, 2008 (FI) ...................................... 20086181

(51) Int. Cl.
 *H02J 3/38* (2006.01)
 *H01M 8/04* (2006.01)
 *H02M 7/48* (2006.01)

(52) U.S. Cl.
 CPC .. *H02J 3/38* (2013.01); *Y02E 60/50* (2013.01); *H02M 7/48* (2013.01)
 USPC .......................................................... 307/85

(58) Field of Classification Search
 CPC .............. H02J 3/38; H02J 3/387; H01M 8/04
 USPC .......................................................... 307/85
 See application file for complete search history.

(56) References Cited

U.S. PATENT DOCUMENTS

| 5,760,488 A | 6/1998 | Sonntag |
| 2004/0189330 A1 | 9/2004 | Herb et al. |

(Continued)

FOREIGN PATENT DOCUMENTS

| DE | 19503749 C1 | 4/1996 |
| EP | 1437600 A1 | 7/2004 |

(Continued)

OTHER PUBLICATIONS

International Search Report (PCT/ISA/210) issued on Aug. 9, 2010, by European Patent Office as the International Searching Authority for International Application No. PCT/FI2009/050968.

(Continued)

*Primary Examiner* — Hal Kaplan
(74) *Attorney, Agent, or Firm* — Buchannan Ingersoll & Rooney PC

(57) ABSTRACT

A method is disclosed for producing electrical current by a fuel cell device, which inputs electrical current to an electrical network. A fuel cell device can be arranged to be parallel connected to the electrical network. A phase reference signal can be utilized in the inputting of the electrical current, and electrical current inputted to electrical network can be current controlled by a power transformer having a power stage. The fuel cell device can be switched off from the electrical network when a malfunction occurs in the electrical network. The fuel cell device can be changed, using the phase reference signal, to the switched off operation mode for performing voltage controlled operation of the power transformer. A controllable load can be used for maintaining a power stability between the voltage controlled power transformer and other parts of the fuel cell device. When the malfunction has vanished, the fuel cell device can be changed, using the phase reference signal, to a switched on operation mode for performing current controlled operation of the power transformer.

12 Claims, 3 Drawing Sheets

(56) References Cited

U.S. PATENT DOCUMENTS

| | | |
|---|---|---|
| 2005/0143846 A1 | 6/2005 | Kocher et al. |
| 2006/0003198 A1 | 1/2006 | Leitz |
| 2007/0285102 A1 | 12/2007 | Muller |
| 2008/0158756 A1 | 7/2008 | Lindsey et al. |

FOREIGN PATENT DOCUMENTS

| | | |
|---|---|---|
| JP | 9-182456 A | 7/1997 |
| JP | 9-274062 A | 10/1997 |
| JP | 2000-341862 A | 12/2000 |
| JP | 2005-268149 A | 9/2005 |
| JP | 2006-204067 A | 8/2006 |
| JP | 2007-135364 A | 5/2007 |
| JP | 2008-10178 A | 1/2008 |
| JP | 2008-22650 A | 1/2008 |
| JP | 2008-59968 A | 3/2008 |

OTHER PUBLICATIONS

International Preliminary Report on Patentability (PCT/IPEA/409) issued on Mar. 14, 2011, by European Patent Office as the International Examining Authority for International Application No. PCT/FI2009/050968.

Finnish Search Report dated Nov. 16, 2009 for Application No. FI 20086181.

Haiman Tao et al., Line-Interactive UPS Using a Fuel Cell as the Primary Source, IEEE Transactions of Industrial Electronics, vol. 55, No. 8, Aug. 2008, pp. 3012-3021.

Sangmin Jung et al., A Low Cost Utility Interactive Inverter for Residential Fuel Cell Generation, IEE Transactions on Power Electronics, vol. 22, No. 6, Nov. 2007, pp. 2293-2298.

Guoqiao Shen et al., Instantaneous Voltage Regulated Seamless Transfer Control Strategy for Utiliyt-internconnected Fuel Cell Inverters with an LCL-filter, IEEE 5th International Power Electronics and Motion Control Confer, Aug. 14, 2006, pp. 1-5.

International Search Report (PCT/ISA/210) issued on Jun. 22, 2010, by European Patent Office as the International Searching Authority for International Application No. PCT/FI2009/051028.

International Preliminary Report on Patentability (PCT/IPEA/409) issued on Dec. 27, 2010, by European Patent Office as the International Examining Authority for International Application No. PCT/FI2009/051028.

Finnish Search Report dated Nov. 3, 2009 for Application No. FI 20095053.

Japanese Office Action dated Nov. 12, 2013, issued by the Japanese Patent Office in corresponding Japanese Patent Application No. 2011-539064. (3 pages).

US 8,890,365 B2

FUEL CELL DEVICE AND METHOD FOR FEEDING ELECTRICAL CURRENT TO ELECTRICAL NETWORK

RELATED APPLICATIONS

This application claims priority as a continuation application under 35 U.S.C. §120 to PCT/FI2009/050968, which was filed as an International Application on Dec. 1, 2009 designating the U.S., and which claims priority to Finnish Application 20086181 filed in Finland on Dec. 9, 2008. The entire contents of these applications are hereby incorporated by reference in their entireties.

FIELD

Fuel cell devices are becoming popular in fulfilling different kinds of electricity production needs. Fuel cell devices are electrochemical devices supplied with reactants for producing electrical energy.

BACKGROUND INFORMATION

Fuel cell devices are electrochemical devices, which can enable production of electricity with high duty ratio in an environmentally friendly process. Fuel cell technology is considered to be one of the most promising future energy production methods.

An exemplary fuel cell, as presented in FIG. 1, includes an anode side 100 and a cathode side 102 and an electrolyte material 104 between them. The reactants fed to the fuel cell devices undergo a process in which electrical energy and heat are produced as a result of an exothermal reaction.

In solid oxide fuel cells (SOFCs), oxygen 106 is fed to the cathode side 102 and it is reduced to a negative oxygen ion by receiving electrons from the cathode. The negative oxygen ion goes through the electrolyte material 104 to the anode side 100 where it reacts with the used fuel 108 producing water and also, for example, carbondioxide (CO2). Between the anode and cathode is an external electric circuit 111 for transferring electrons e– to the cathode. An external electric circuit can include a load 110.

FIG. 2 shows a SOFC device, which can utilize as fuel for example, natural gas, bio gas, methanol or other compounds comprising (e.g., containing) hydrocarbons. The SOFC device in FIG. 2 can include planar-like fuel cells in stack formation 103 (SOFC stack). Each fuel cell can include an anode 100 and a cathode 102 structure as presented in FIG. 1. Part of the used fuel can be recirculated in feedback arrangement 109 through each anode.

The SOFC device in FIG. 2 can include a fuel heat exchanger 105 and a reformer 107. Heat exchangers can be used for controlling thermal conditions in a fuel cell process and there can be more than one of them located in different locations of SOFC device. The extra thermal energy in a circulating gas can be recovered in the heat exchanger 105 to be utilized in the SOFC device or outside in a heat recovering unit. The heat recovering heat exchanger can thus be located in different locations as shown in FIG. 2. A reformer is a device that converts the fuel, such as for example natural gas, to a composition suitable for fuel cells such as, for example, a composition comprising (e.g., containing) half hydrogen and half methane, carbondioxide and inert gases. The reformer is not, however, necessary in all fuel cell implementations, but untreated fuel may also be fed directly to the fuel cells 103.

By using a measurement device 115 (such as fuel flow meter, current meter and temperature meter) measurements can be performed for the operation of the SOFC device from the through anode recirculating gas. Only part of the gas used at anodes 100 (FIG. 1) of the fuel cells 103 is recirculated through anodes in the feedback arrangement 109 and thus FIG. 2 diagrammatically shows another part of the gas is exhausted 114 from the anodes 100.

A fuel cell device can produce electrical energy in the form of direct current of a low voltage level. The voltage level can be raised by combining several fuel cells or combinations of fuel cells to form a serial connection such as, for example, a stacked formation. Current-voltage characteristics of the fuel cells depend on, for example, reactant compositions, mass flow, temperature and pressure. Electrochemical reactions in the fuel cell can react quickly to fluctuations in the fuel cell load. However, the response capacity of reactants input can be much slower, meaning response times of seconds or even minutes. When trying to obtain more efficiency out of fuel cells than the prevailing input of reactants allows, a weakening of fuel cell voltages can occur, and even an irreversible deterioration of fuel cells is possible. In addition, load changes can cause rapid temperature changes in the fuel cell, which especially in high temperature fuel cells cause harmful thermomechanical stress, resulting in significant reduction of performance and life time of fuel cells. Thus, fuel cell systems are designed so that the load of each fuel cell is kept as constant as possible and a possible change in the load is carried out in as controllable a fashion as possible.

When the fuel cells are used to obtain independent variable AC loads, or to supply power to a distribution network, a DC-AC converter is used to convert DC power to AC power. There may also be a desire for DC-DC converters to raise DC voltage obtained from the fuel cells to a level which is suitable for DC-AC converter. However, due to the highly limited compatibility and capacity of the fuel cells to respond to changes in load, known fuel cell implementations, especially high temperature fuel cell implementations, can be bad power sources for feeding independent variable AC loads or to feed variable power to the distribution network. A well-known way to try to address this issue is the use of an energy buffer, which includes, for example use of lead acid batteries. The function of energy buffer is to feed or consume power in rapidly changing conditions so that the load variation of fuel cell would be controlled. Especially in large fuel cell systems, disadvantages of such known implementations become more serious due to high cost, large size and heavy weight and limited effectiveness. In electrical network coupled applications, an alternative known implementation to maintain a constant fuel cell load is to use a current controlled transform in feeding power to the network. The control based on current controlled transform is not suitable in network independent operation, and thus can not be used as an emergency power source for AC loads inside or outside the fuel cell system.

High temperature fuel cell systems can involve a major heat energy amount for heating systems up to operating temperatures. From this follows that start-up times can be up to tens of hours in length. Wide temperature alternations in shut down and start up sequences can expose the fuel cells and related system components to even excessive thermomechanical stress. Thus, the high-temperature fuel cell systems should be designed to operate continuously for as long time periods as possible, for even thousands of hours, without any shut downs. To achieve this, the system should be designed to fulfill high reliability as well as to minimize such external factors, which might shut down the system or might drive the system to harmful operation conditions. Current controlled converters in fuel cell applications are unable to protect the fuel cells from sudden changes in load, arising from different network disruptions such as power failures, voltage dips or transients.

SUMMARY

A fuel cell device is disclosed for producing electrical current to electrical network, and for a parallel connected arrangement to electrical network, wherein the fuel cell device comprises: means for switching the fuel cell device off from an electrical network when a malfunction occurs in the electrical network; a power transformer having a control circuit and a current controlled power stage to input electrical current to the electrical network when the fuel cell device has been parallel connected to electrical network, said control circuit forming a phase reference signal for inputting of the electrical current; and a controllable load for maintaining a power stability of the fuel cell device, wherein said power transformer will change the fuel cell device, using the phase reference signal, to a switched off operation mode from the electrical network for performing voltage controlled operation of the power transformer, and said controllable load for maintaining power stability between the voltage controlled power transformer and other parts of the fuel cell device and, when a malfunction has vanished from the electrical network, said power transformer will change the fuel cell device, using the phase reference signal, to a switched on operation mode to the electrical network for performing current controlled operation of the power transformer.

A method for producing electrical current is also disclosed by a fuel cell device for inputting electrical current to an electrical network when the fuel cell device is parallel connected to the electrical network, electrical current to be input to the electrical network being current controlled by a power transformer having a power stage, and when the fuel cell device has been parallel connected to electrical network, the fuel cell device is switched off from the electrical network when a malfunction occurs in the electrical network, the method comprising: forming a phase reference signal for inputting of electrical current to electrical network; changing the fuel cell device, by using the phase reference signal, to a switched off operation mode from the electrical network for performing voltage controlled operation of the power transformer; and maintaining a power stability between the voltage controlled power transformer and other parts of the fuel cell device using a controllable load; and when the malfunction has vanished from electrical network, charging the fuel cell device, using the phase reference signal, to switched on operation mode to the electrical network for performing current controlled operation of the power transformer.

BRIEF DESCRIPTION OF THE DRAWINGS

Other features and advantages disclosed herein will become apparent by reference to the accompanying drawings, wherein exemplary embodiments are illustrated, and wherein.

DETAILED DESCRIPTION

Figure 1:
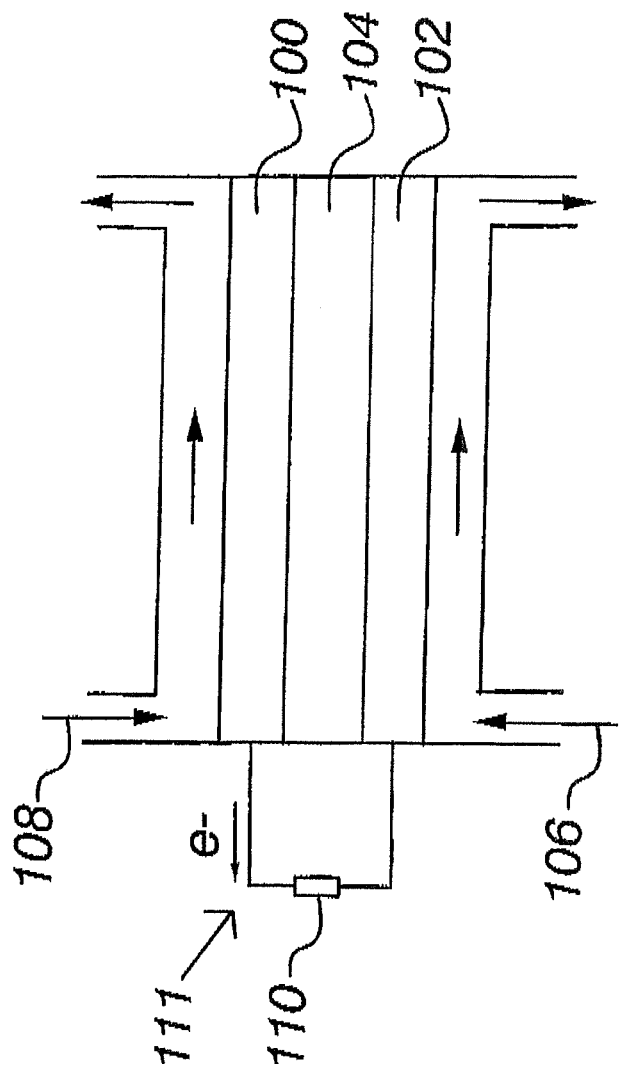
FIG. 1 presents an exemplary single fuel cell structure.
Figure 2:
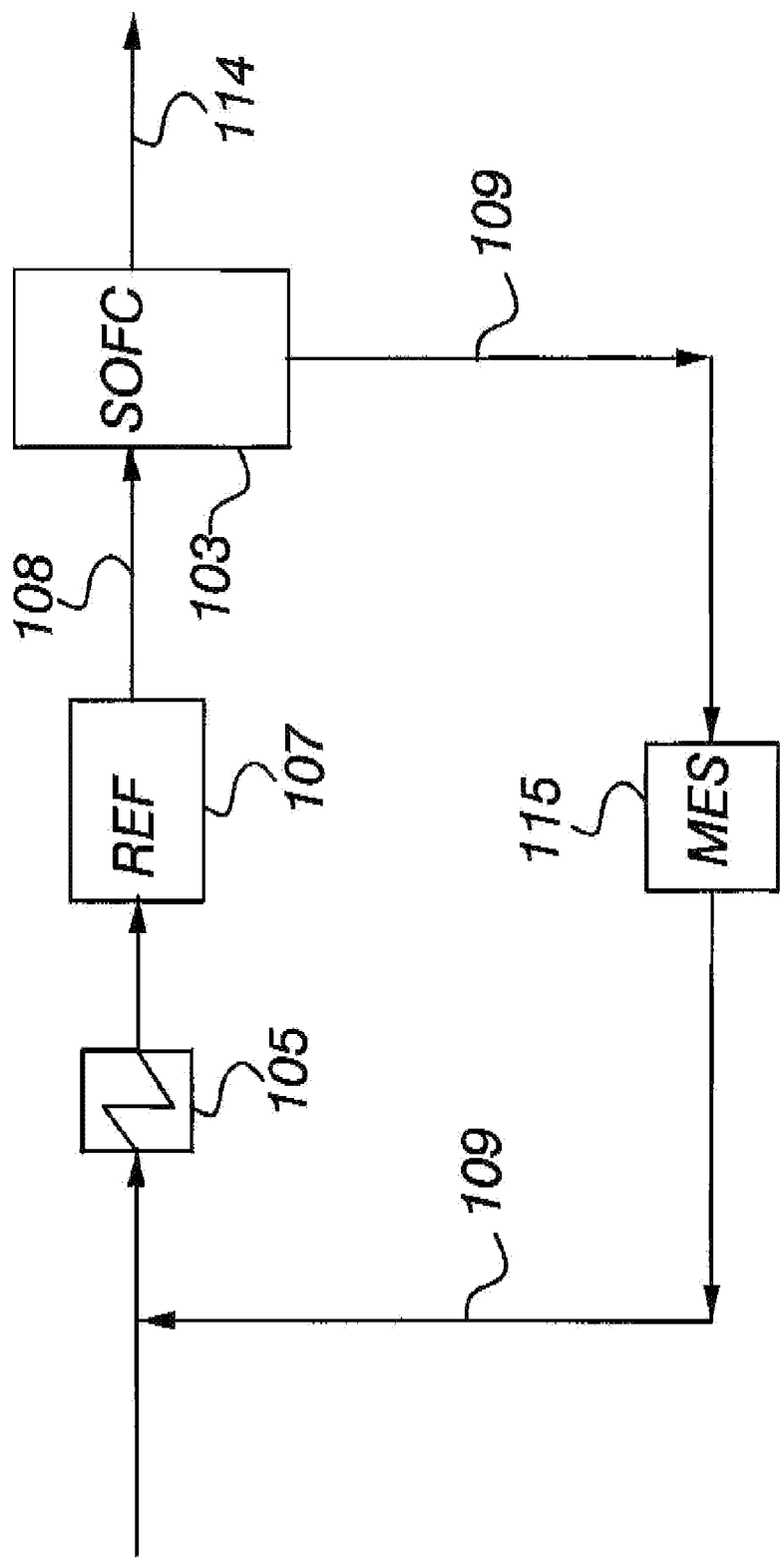
FIG. 2 presents an exemplary fuel cell device; and,
FIG. 3 presents an exemplary embodiment according to the present disclosure.

An exemplary fuel cell device is disclosed herein without a separate storage arrangement for electrical energy, and the fuel cell device feeds a good quality electrical current to the electrical network, and when a malfunction occurs in the electrical network the fuel cell device changes immediately to a switched off operation mode from electrical network to be utilized for other functions. This can be achieved by a fuel cell device for producing electrical current to an electrical network. At least one fuel cell device has been arranged to be parallel connected to an electrical network, and includes a power transformer having a control circuit and a current controlled power stage to input electrical current to the electrical network, when the fuel cell device has been parallel connected to the electrical network. As disclosed herein, a system can include a control circuit for forming a phase reference signal to be utilized in the inputting of the electrical current, a controllable load for maintaining a power stability of the fuel cell device, and means for switching the fuel cell device off from the electrical network when a malfunction occurs in electrical network. The power transformer can change the fuel cell device by using the phase reference signal to a switch off operation mode from electrical network for performing voltage controlled operation of the power transformer. The controllable load can maintain power stability between the voltage controlled power transformer and other parts of the fuel cell device. When a malfunction has vanished from electrical network, the power transformer can change the fuel cell device, using the phase reference signal, to a switch on operation mode to the electrical network for performing current controlled operation of the power transformer.

A method is also disclosed for producing electrical current by a fuel cell device, which inputs electrical current to an electrical network. In an exemplary method, at least one fuel cell device is arranged to be parallel connected to the electrical network. A phase reference signal is formed to be utilized in the inputting of the electrical current, and electrical current is inputted to electrical network current controlled by means of a power transformer comprising a power stage. When the fuel cell device has been parallel connected to the electrical network, the fuel cell device is switched off from the electrical network. When a malfunction occurs in electrical network, the fuel cell device is changed, using the phase reference signal, to a switched off operation mode from the electrical network for performing voltage controlled operation of the power transformer, and a controllable load is used for maintaining a power stability between the voltage controlled power transformer and other parts of the fuel cell device. When the malfunction has vanished from the electrical network, the fuel cell device is changed, using the phase reference signal, to a switched on operation mode to the electrical network for performing current controlled operation of the power transformer.

As disclosed herein, a current controlled power transform topology can be utilized in the operation of the fuel cell device, and the phase reference signal can be utilized in inputting electrical current to electrical network. When a malfunction occurs in the electrical network the fuel cell device can be switched off immediately from the electrical network by using means for performing the switch off. By utilizing the phase reference signal and the controllable load, the fuel cell device is changed to switched off operation mode from an electrical network where part of the fuel cell device according to the disclosure operates voltage controllably. By using the controllable load, a power imbalance can be balanced.

Exemplary embodiments can provide successful implementation of a fuel cell device, to ensure a steady fuel cell load in different situations without a need for an expensive and separate electrical energy storage arrangement. In an exemplary embodiment according to the disclosure, the operation mode of fuel cell device is changed, from an operation mode in which the fuel cell device is parallel connected to electrical network, to an operation mode in which the fuel cell device is switched off from the electrical network, immediately when a malfunction is detected in electrical network. Thus, the fuel cell device can continue to operate during a short term or long term malfunction of the electrical network. By this, a long term start up processes of fuel cell devices can be neglected, and during the malfunction of electrical network, the operation of fuel cell device can be utilized for some other purpose such as to operate as an emergency power source, for example, to a base station 132 of mobile phone network. After the malfunction of the electrical network has passed or been addressed, the operation of the fuel cell device can be reversed immediately to the switched on operation mode to the electrical network, in which the fuel cell device feeds current to the electrical network.

Figure 3:
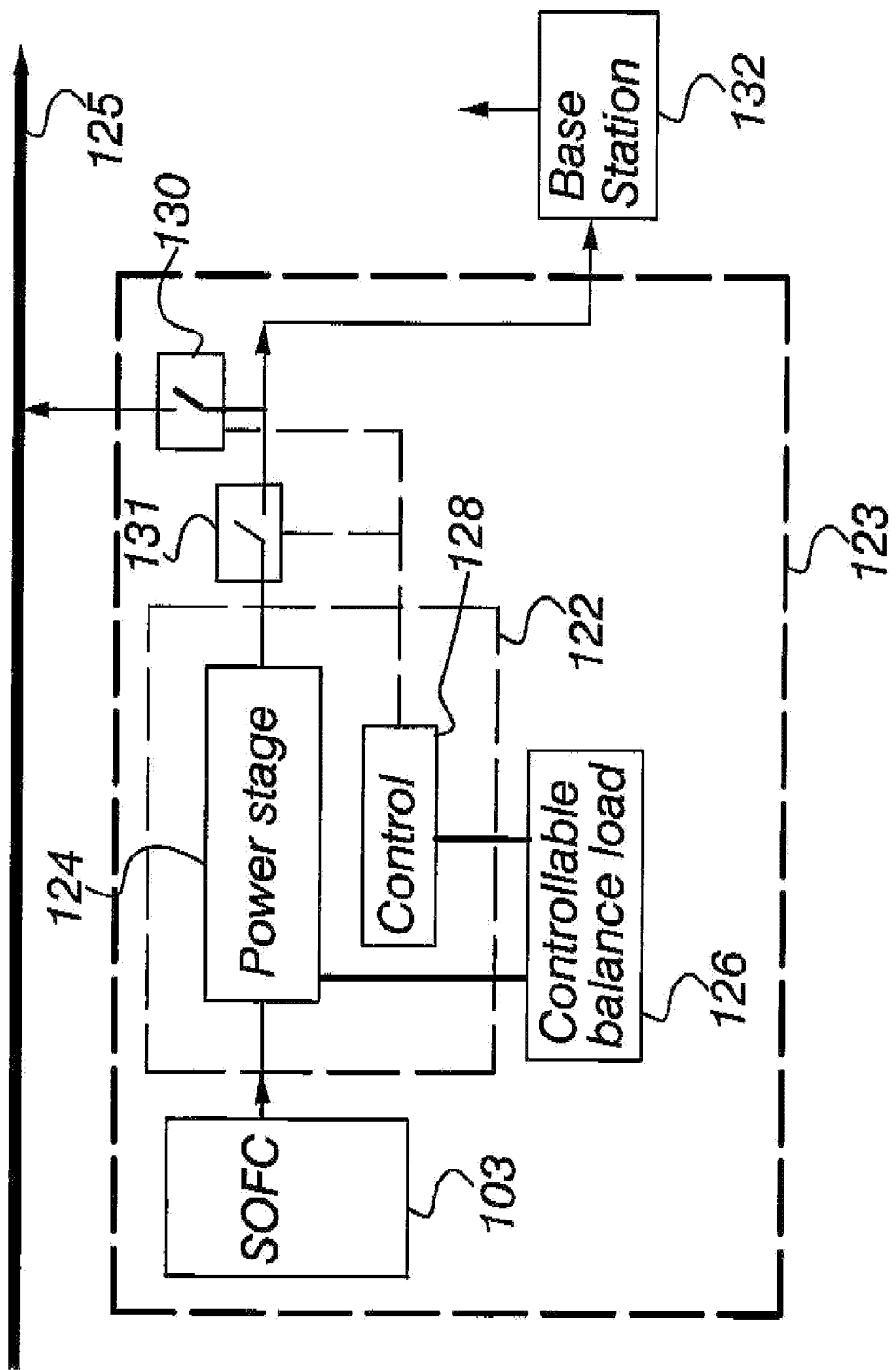

In exemplary embodiments according to the disclosure, fuel cell technology can be successfully utilized in feeding current to electrical network 125, and also in cases, in which a fuel cell device 123 is switched off from the electrical network, to perform unconnected operation. In the following description an exemplary embodiment of the disclosure is shown in FIG. 3, which shows a block diagram. At least one fuel cell device is arranged to be parallel connected to an electrical network for feeding to electrical network electricity produced by the fuel cell device. A power transformer 122 of the fuel cell device comprises a control circuit 128 and a current controlled power stage 124 to input electrical current to the electrical network, when the fuel cell device 123 has been parallel connected to the electrical network. A power transform topology can be implemented by utilizing current controlled converters, which power stage comprises, for example utilizing current controlled DC-DC converters. An exemplary current controlled embodiment enables the fuel cell to be kept within desired operation ranges, even when a voltage of the fuel cell varies or an intermediate circuit voltage of DC-AC converter varies. In fuel cell systems comprising a number of fuel cell stacks, separate DC-DC converters can be used for each stack or group of stacks to ensure controllability of a division of loads between the fuel cell stacks.

In the switched on operation mode of the fuel cell device 123 to electrical network 125, current produced by the fuel cell device can be feed to the electrical network by a three phase current controlled power stage 124. A power transformer 122 comprises a control circuit 128 for forming a phase reference signal to input electrical current to the electrical network. The phase reference signal is formed for example so that a three phase sinusoidal reference signal in the control circuit 128 for phase currents is kept essentially constant. The phase reference signal (e.g., the sine wave reference signal) can be formed by the control circuit frequency locked in three phase as compared to a three phase mains voltage. By applying an offset value to the sine wave reference signal, a phase angle of the current to be fed to the electrical network can in certain limits be freely set as having a delay or as being ahead of time. Also amplitude control can be performed by the control circuit 128 so that the phase reference signal (e.g., in this example the sine wave reference signal) is multiplied with an amplitude reference signal, which is derived from an intermediate circuit voltage of the power stage 124. In this way, the amplitude control can be carried out in such a minimum level, which is sufficient to allow an undistorted current feed-in to the electrical network, thus optimizing efficiency of the fuel cell device.

In an exemplary embodiment of the disclosure, means for switching the fuel cell device off from electrical network can include a protective relay arrangement 130 for switching the fuel cell device to a switched off operation mode from electrical network immediately (e.g., within a specified time period, including a near instantaneous response) when a malfunction occurs in electrical network. The malfunction in an electrical network is detected for example on the basis of voltage or frequency detection. The switch-off is signalled by a transmitter to the control circuit 128 of the power transformer 122, and by using the control circuit based on an internal sine wave reference signal of the control circuit, operation of the fuel cell device can be transferred immediately to the switched off operation mode from electrical network. In the switched off operation mode from electrical network, the fuel cell device 123 operates in voltage controlled operation mode, in which is formed a stable load independent three phase voltage. The protection relay 130 can be configured by using a transmitter-receiver arrangement to communicate with other protective relays 131, which the fuel cell device comprises, so that the fuel cell device forms a local isolated unit comprising loads 132 (for example, the mobile phone network base station), for which the fuel cell device can operate as an emergency power source, when desired or when a need arises. Sharing of the loads with possible other voltage units of the unit can be performed for example by applying a negative feedback between power supply and frequency. The protective relay 131 presented in FIG. 3 is not necessary in implementation of the disclosure.

In a switched off operation mode from the electrical network, fuel cells of the fuel cell device 123 can be kept in constant load conditions by utilizing a controllable load for maintaining power stability (e.g., so called buffer load), whose loading is adapted to eliminate a difference, which is based on a difference between electrical power produced from fuel cells and present actual electrical power need of loads. After switching off from the electrical network, a power transformer 122, which is in one exemplary embodiment of the disclosure presented here as a DC/AC transformer, operates in a voltage controlled operation mode, although loading of the fuel cells 103 continues as current controllable. A controllable load 126 can be used to balance the power imbalances caused by voltage and current controls. Adapting of the controllable load 126 can be accomplished by a control arrangement based on present intermediate circuit voltage values of the power stage. A means for controlling can be, for example a thyristor controller, whose triggering angle is controlled. The electrical power amount, which is fed to the controllable load 126, represents also a marginal for increasing present electrical power fed to the loads. Electric energy storage can be provided, for example, only if the fuel cell device is intended for a longer period to feed AC power beyond a nominally produced operating power.

Malfunction of electrical network 125 may vary, and can be specified to depend on duration (e.g., short-term, such as a voltage spike or long-term such as blackouts). When a detected malfunction has been dismissed from electrical network, operation of the fuel cell device 123 can be returned immediately (e.g., within a specified time period, including a user instantaneous response) to a switched on electrical network operation mode, where the fuel cell device feeds current to electrical network. An exemplary embodiment of the disclosure can thus also be appointed as network interactive electrical power balancer for fuel cell device applications connectable to different kinds of electrical networks. The electrical network can therefore be a single-phase, two-phase, three-phase, and so on, alternating current network and also can be a DC power networks.

For fuel cell devices, which are primarily intended for operation parallel to an electrical network, such as for example divisional fuel cell systems, it can be a major advantage to have the possibility to operate without an arrangement to store electrical energy. In the switched on electrical network operation mode according to the disclosure, the absence of storage arrangement for electrical energy can mean efficiency benefits, because it is not necessary to separately produce electricity to maintain an electrical energy amount of energy storage sufficiently high. In the switched off operation mode from the electrical network according to the disclosure, power lost in resistors can be meaningless, because time periods of the operation mode can be relatively short. Although the electric energy storage can be involved in a fuel cell device, the fuel cell device can operate at a certain minimum load, so that a specified temperature balance is achieved in the operation of fuel cell device. In an exemplary according to the disclosure, minimum permissible load of the fuel cell can be reduced by setting a resistance load near the fuel cells and by utilizing thermal energy of the resistance load for heating fuel cells and/or when the fuel cell device operates as an emergency power source for an external load 132 such as, for example, for the mobile phone network base station.

Although exemplary embodiments according to the disclosure can be utilized in SOFC fuel cell devices, it should be noted, that embodiments according to the disclosure can be utilized in different kinds of fuel cell devices. In the exemplary embodiment of the disclosure, the electrical network can be the common electrical power distribution network, and DC electricity produced by the fuel cell device can be fed to the network for example through a three phase DC-AC transform. In exemplary embodiments according to the disclosure, many kinds of electrical network applications can be implemented, and thus for example DC-AC transform is not needed in every application.

Although the disclosure has been presented in reference to the attached figures and specification, the disclosure is not limited to those as the disclosure is subject to variations within the scope allowed for by the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A fuel cell device for producing electrical current to an electrical network, and for a parallel connected arrangement to the electrical network, wherein the fuel cell device comprises:
   means for switching the fuel cell device off from an electrical network when a malfunction occurs in the electrical network;
   a power transformer having a control circuit and a current controlled power stage to input electrical current to the electrical network when the fuel cell device has been parallel connected to electrical network, said control circuit forming a phase reference signal for inputting of the electrical current; and
   a controllable load for maintaining a power stability of the fuel cell device, wherein said power transformer will change the fuel cell device, using the phase reference signal, to a switched off operation mode from the electrical network for performing voltage controlled operation of the power transformer, and said controllable load for maintaining power stability between the voltage controlled power transformer and other parts of the fuel cell device and, when the malfunction has vanished from the electrical network, said power transformer will change the fuel cell device, using the phase reference signal, to a switched on operation mode to the electrical network for performing current controlled operation of the power transformer.

2. The fuel cell device in accordance with claim 1, wherein the control circuit is configured for forming a three phase sinusoidal phase reference signal to input electrical current to electrical network.

3. The fuel cell device in accordance with claim 1, wherein the control circuit is configured for multiplying the phase reference signal with an amplitude reference signal for inputting nondistorted electrical current to the electrical network to optimize efficiency of the fuel cell device.

4. The fuel cell device in accordance with claim 3, comprising:
   a current controlled power stage having an intermediate circuit, and said amplitude reference signal is derived from voltage of the intermediate circuit.

5. The fuel cell device in accordance with claim 1, wherein the controllable load is provided for arranging the operation of the fuel cell device to an emergency power source operation in the operation mode when the fuel cell device is switched off from the electrical network.

6. The fuel cell device in accordance with claim 1, wherein the fuel cell device comprises:
   plural fuel cell stacks; and
   a separate DC-DC converter for each fuel cell stack or for a group of fuel cell stacks to control division of loads between the fuel cell stacks.

7. A method for producing electrical current by a fuel cell device for inputting electrical current to an electrical network when the fuel cell device is parallel connected to the electrical network, the electrical current to be input to the electrical network being current controlled by a power transformer having a power stage, and when the fuel cell device has been parallel connected to the electrical network, the fuel cell device is switched off from the electrical network when a malfunction occurs in the electrical network, the method comprising:
   forming a phase reference signal for inputting of electrical current to the electrical network;
   changing the fuel cell device, by using the phase reference signal, to a switched off operation mode from the electrical network for performing voltage controlled operation of the power transformer; and
   maintaining a power stability between the voltage controlled power transformer and other parts of the fuel cell device using a controllable load; and
   when the malfunction has vanished from the electrical network, changing the fuel cell device, using the phase reference signal, to switched on operation mode to the electrical network for performing current controlled operation of the power transformer.

8. The method in accordance with claim 7, comprising:
   forming a three phase sinusoidal phase reference signal to input electrical current to the electrical network.

9. The method in accordance with claim 7, comprising:
multiplying the phase reference signal with an amplitude reference signal to input nondistorted electrical current to the electrical network to optimize efficiency of the fuel cell device.

10. The method in accordance with claim 9, comprising:
deriving the amplitude reference signal from voltage of an intermediate circuit of the power stage.

11. The method in accordance with claim 7, comprising:
using the controllable load for operating the fuel cell device for an emergency power source operation in operation mode when the fuel cell device is switched off from the electrical network.

12. The method in accordance with claim 7, comprising:
including separate DC-DC converters for fuel cell stacks, or for groups of fuel cell stacks, to provide controlled division of loads between the fuel cell stacks or division of loads between the groups of fuel cell stacks.

\* \* \* \* \*